June 18, 1935.  E. E. WEMP  2,005,250

DRIVING MECHANISM AND CLUTCH

Filed Feb. 4, 1931   2 Sheets-Sheet 2

INVENTOR.
ERNEST E. WEMP

BY Barnes & Kisselle
ATTORNEYS

Patented June 18, 1935

2,005,250

UNITED STATES PATENT OFFICE 2,005,250

DRIVING MECHANISM AND CLUTCH

Ernest E. Wemp, Detroit, Mich.

Application February 4, 1931, Serial No. 513,327

14 Claims. (Cl. 192—48)

This invention has to do with driving mechanism for transmitting power from driving to driven parts and has special reference to driving mechanism and clutch arrangement useful in automotive vehicles.

In accordance with the invention clutch parts comprising both driving and driven parts may advantageously be arranged as a unit on a driving member, which member in the present disclosure happens to be the crank-shaft of an engine. A driven shaft is employed and the arrangement may be such that the driven shaft does not support or carry the driven clutch member. In carrying out this arrangement a one-way drive connection is advantageously employed between the driven shaft and the driven clutch member.

More specifically, the clutch parts, including driving and driven members, may be assembled upon the crank-shaft of an automobile engine, thus to serve not only as clutch parts but also to effect a fly wheel action for the engine. These clutch parts may be auxiliary to a fly wheel per se, else they may be utilized as the sole fly wheel element of the engine. Due to the construction contemplated polar inertia of the driven shaft is maintained at a substantial minimum by reason of not carrying parts, such as for example, driven clutch parts extending a considerable distance radially outward of the axial center. The construction affords simplified vehicle operation particularly in regard to shifting gears as the clutch engagement and disengagement may be effected by accelerating or decelerating the engine, respectively, and also by the employment of the overrunning drive connection or one-way drive connection which permits of the so-called free wheeling action. In other words, the movements of the gear shifting lever, which is appreciated by anyone who drives an automotive vehicle, may be accomplished without any manual clutch control save for merely causing engine deceleration. The driven shaft and some of its associated parts may be assembled as a unit independently of the driven clutch member which is assembled with the driving clutch parts. The invention will be better understood by reference to the accompanying drawings and following detailed description:

Fig. 3 is a more or less diagrammatic view illustrating two of three possible positions of a control element.

Figure 1:
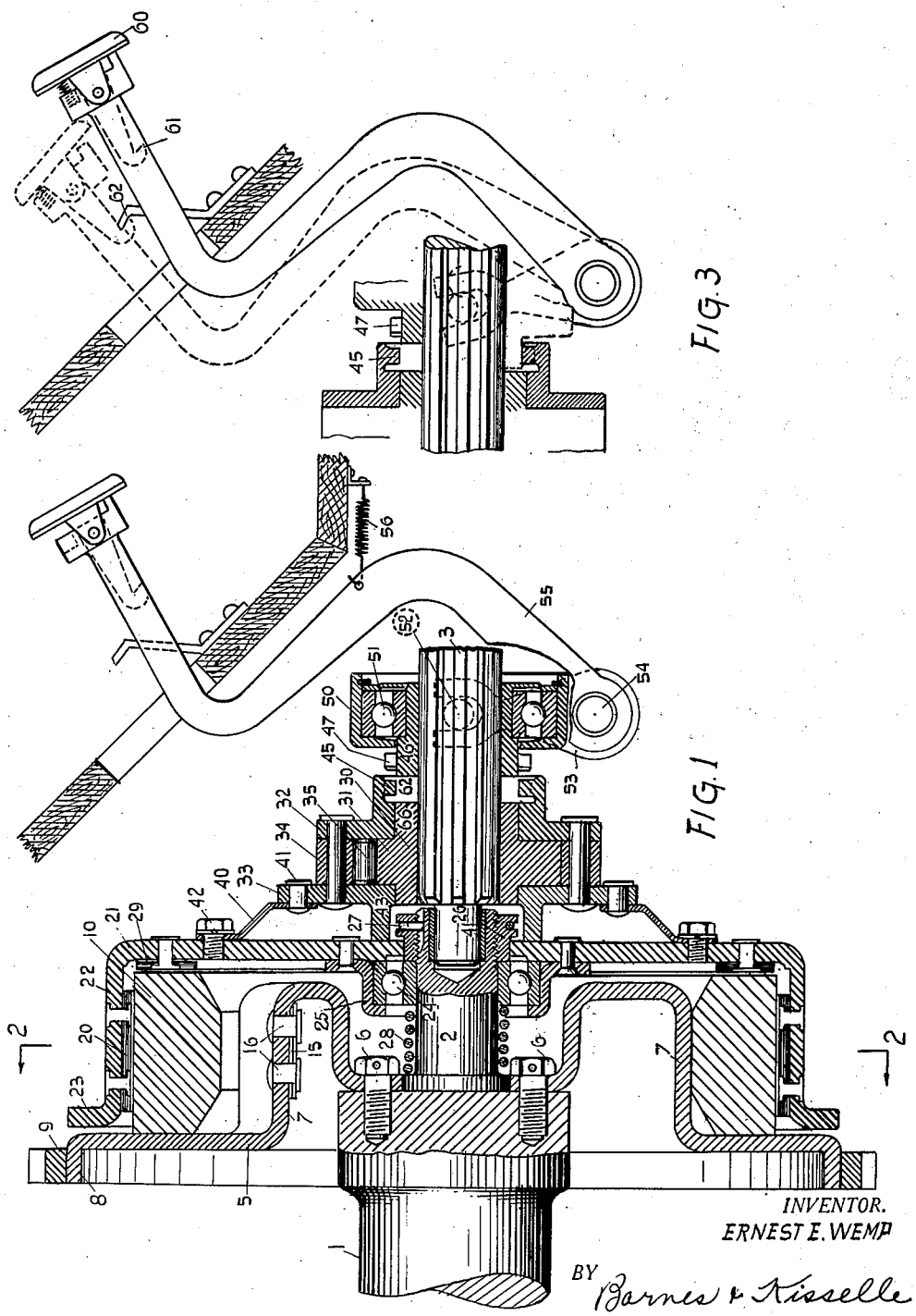
Fig. 1 is a sectional view taken through a clutch and drive construction made in accordance with the present invention.

As shown in the drawings, the end or extension of a crank-shaft of an engine is illustrated at 1 having a reduced extreme end portion 2. A driven shaft is shown at 3, its end being journaled in a bearing 4 in the end of the crank-shaft.

As has already been mentioned, some of the clutch parts may serve as the engine fly wheel, either entirely or in part as may be desired, and as shown herein some of the clutch parts serve as the only fly wheel of the engine. One of such parts comprises a member 5 secured to the crank-shaft by cap screws 6 taken into the shoulder between parts 1 and 2 of the crankshaft. This part 5 may be shaped so as to provide a part 7 extending generally in a circumferential direction and of requisite dimension axially. The outermost part of the member 5 may be flanged, as at 8, for carrying a toothed ring gear 9 which is adapted to be engaged by any desirable engine starting mechanism.

Figure 2:
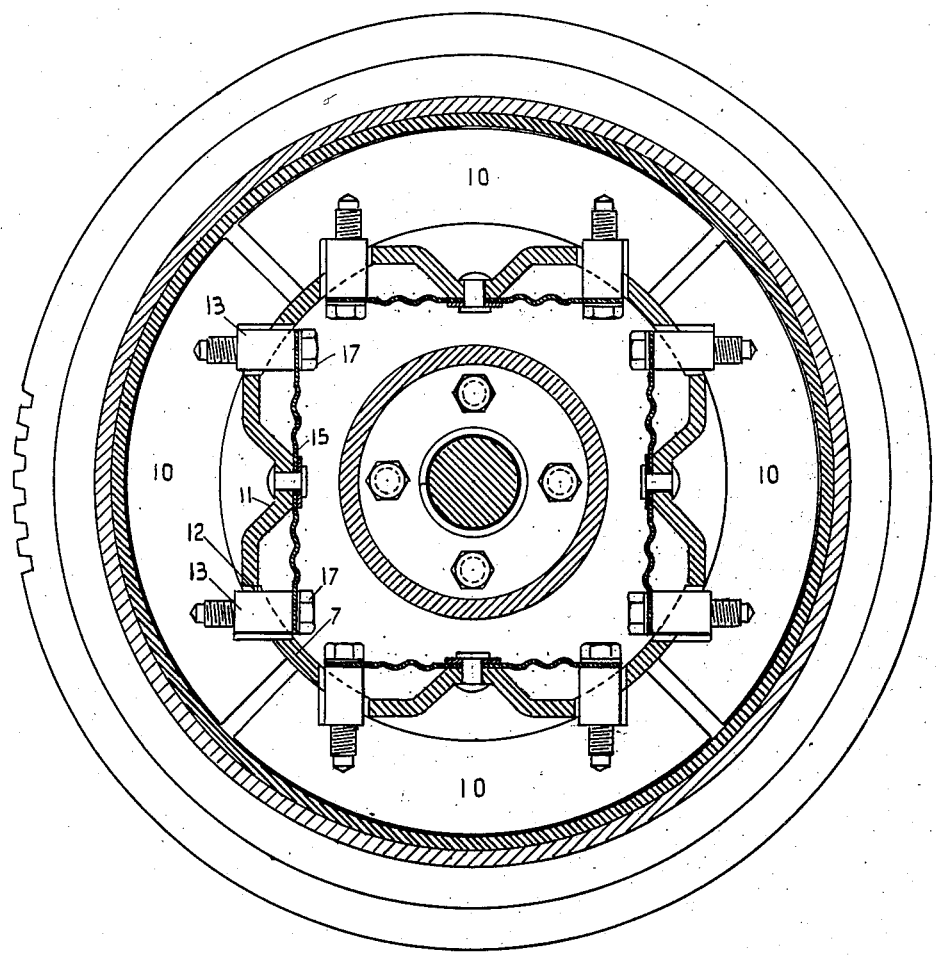
Fig. 2 is a sectional view taken substantially on line 2—2 of Fig. 1.

The clutching action may be effected by centrifugally controlled elements such as weights 10. As shown in Fig. 2 there are four of such weights, the same being segmental in shape. These weights are carried by the member 5. For this purpose the circumferential portions 7 may be formed with depressed portions 11, one for each weight, and with apertures 12. Studs 13 may be screwed into the weights having portions which extend through the apertures 12 with suitable clearance, these studs serving in part to hold the weights 10 to the plate 5. Supporting means are attached to the studs and the supporting means is of such character as to permit the weights to move in and out as they are centrifugally controlled. As shown herein, such means comprises a plate or sheet metal member 15, attached substantially centrally to the depressed part 11 by rivets or the like 16, and attached at each end to a stud 13 by means of cap screws 17. The plates are constructed so as to have an overall length between centers of rivets 16 and studs 13 greater than the straight line distance center to center. This may be accomplished by corrugating the plates as shown. These plates or sheet steel members are preferably of a springy nature and normally hold the weights radially inward so that they seat upon the part 7. In such normal position there is a clearance between the outer faces of the weights and friction material 20 carried by a driven member.

This driven member, shown generally at 21, may be advantageously in the shape of a dished member having a circumferential part 22 carrying the facing material 20 and provided with a reinforcing flange 23, the purpose of which will presently appear. The member 21 is journaled upon the end of the crank-shaft 1 and this may be accomplished through the means of an anti-friction bearing 24 supporting the member 21 through a hub part 25 fitting over the bearing. It may be held in assembled position by means of a screw threaded nut 26 on the end of the crank-shaft locked by a suitable locking spring 27. The member 21 as well as the bearing may be held normally rearwardly against nut 26 by coil spring 28. The member 21 may also carry facing material 29 positioned so as to engage the weights 10, but normally spaced from the weights by reason of the action of spring 28.

The assembly just described comprises the driving and driven clutch members which at the same time serves as an engine fly wheel. The driving clutch members consist of the plate 5, the centrifugal weights 10 and other associated parts, whereas the driven clutch member comprises the member 21. When the engine is running the driving parts of the clutch mechanism serve as a fly wheel and as soon as the R. P. M. is high enough the weights are thrown out centrifugally against the action of the spring plates 15 thus causing the weights to engage the friction material 20, setting into motion the driven member 21, so that at this time both driving and driven parts serve a fly wheel function. The arrangement is preferably such that the weights move outwardly centrifugally at a predetermined R. P. M.; for example, this may be at about 600 R. P. M. In this action the plates 15 flex as the weights move out centrifugally. It will be appreciated that the studs 13 must move in a straight line due to the fact that the weights are rigid with the result that in this movement there is a slight change in the distance center to center between the rivets 16 and cap screws 17. In other words, the cap screw cannot move in an arc around the rivets as they are held to move in a straight line. The corrugated formation of the plates permits the same to extend or compress to take care of this differential.

The driven shaft 3 is rotated by means of the driven member 21 and this is preferably accomplished through an overrunning clutch or drive connection. For this purpose there is an inner clutch member 30 secured to the shaft 3 as by means of a spline connection as shown, having a circumferential shoulder 31; and an outer member comprising spaced parts 32 and 33 with an intermediate ring member 34 in alignment with shoulder 31, and between ring 34 and shoulder 31 are clutch rollers 35. This overrunning clutch construction in its general form is appreciated by those skilled in the art; suffice to say that the space provided for roller 35 is of tapering form afforded by cam surfaces either on ring 34 or shoulder 31, or both, so that the rollers are jammed between the two when the drive comes in one direction and are released when the drive comes in the other direction.

The outer member of the overrunning clutch is connected to the member 21 and this is preferably accomplished through a plate or ring 40 riveted to member 33 as at 41 and secured to member 21 by cap screws 42. Also member 33 is arranged with an extension or hub like part 43 projecting so as to substantially contact with member 21, the purpose of which will presently appear.

The member of the overrunning clutch, which is attached directly to the part 21, is designed to be directly connected to shaft 3 when and if desired. For this purpose part 32 has a hub like extension with internal teeth 45. A collar 46 is splined to the shaft 3 having external teeth 47. This collar 46 is reciprocable upon the shaft 3, and this may be accomplished through the means of an outer member 50 between which and the collar 46 is an anti-friction bearing 51, the outer member 50 having a stud 52 engaged in the forked end of an arm 53 carried by rock-shaft 54. On the rock-shaft 54 is a control element which is shown herein as in the form of a foot lever 55. This foot lever may take three positions, one position of which is shown in Fig. 1, held by a spring or the like 56. By depressing the lever with the foot the collar 46 is moved so that the teeth 45 and 47 come into engagement as shown in position 2 of Fig. 3. The normal open position is shown in Fig. 3. If it is desirable to keep the teeth in engagement the lever may be latched in position two. This may be accomplished by any suitable means, as for example, a pivoted foot pad 60 having a hook 61 designed to be hooked behind a latch 62. Positions one and two are shown in Fig. 3. The third position is merely that of the lever being further depressed. The ultimate result of this is to cause friction facing 29 to engage the weights 10. The manner and purpose of which will soon appear.

In considering the operation of the construction it will be assumed that shaft 3 is a shaft entering a gear shifting transmission of an automotive vehicle. Now with the engine slowly rotating, as for example less than 600 R. P. M., the weights 10 are retracted and the member 21 is not rotated with the result that the shaft 3 does not rotate. An operator may now shift the gear shifting lever into low gear position. Upon acceleration of the engine the weights 10 effect clutch engagement and the shaft 3 is driven through the overrunning clutch and the vehicle gets under way. The engine may now be decelerated to disengage the clutching action by reason of the spring plates 15 pulling the centrifugal weights 10 radially inward, and the gear shifting lever may be moved into second gear. The engine may be again accelerated effecting clutch engagement and an increase in speed of the vehicle, then again decelerated causing a declutching action, and the gear shifting lever moved into third or high gear position. Any number of speeds may be provided in the transmission. Assuming that the third gear is the high or direct drive, the engine may now be accelerated which causes a clutch engagement and the vehicle is in normal road operation. Thus it will be obvious that in operating such a vehicle the operator is not required to throw out the clutch as this is automatically done by engine deceleration; all the operator needs to do is to accelerate and decelerate his engine and shift the gears in timed relation thereto. It will be noted that the polar inertia of the driven shaft 3 is low, as it is free to overrun the plate 21, and all the parts directly carried by the driven shaft are located close to its axial center so that its polar inertia is held to minimum. This further facilitates gear shifting, for when the driven shaft 3 is freed by clutch disengagement it decelerates rapidly.

With the overrunning clutch functioning, the vehicle can overrun the engine as this is permitted by reason of the driven shaft 3 being capable of rotating at a higher rate than the engine and/or the driven member 21. There are times, however, when it may be desirable to have the engine directly connected to the driven shaft 3, cutting out the overrunning clutch so that the engine compression may be utilized for its braking action. To do this the operator merely depresses the lever 55 and catches the hook 61 on latch 62 to engage teeth 45 and 47. Accordingly, there is a direct drive connection between shaft 3 and the driven member of the clutch 21. In this position the engine will serve as a brake for the vehicle until such time as engine speed is sufficiently low to cause the declutching action, but at this low speed the vehicle is only traveling slowly and there is substantially no further need for employing the engine as a brake. Also at this low engine speed there is very little braking action by the engine.

There are times when it is either desirable or necessary to start the engine by pushing or towing the vehicle. This could not be done with the present structure, because clutch engagement depends upon engine rotation, without further provision for establishing a drive connection between shaft 3 and the driving clutch parts. The provision of this resides in some of the structure above described and operates as follows: Upon depressing the lever 55 further than that shown in position 2 in Fig. 3, the collar 46, more particularly its end, strikes the hub 30, more particularly its face 66 and pushes member 30 axially. This causes the extension 43 to engage the driven member 21 and urges it axially against the action of spring 28, slightly compressing the spring. The friction material 29 comes into friction contact with the centrifugal weights 10; there may be a minimum of clearance between the weights 10 and the part 5 so that the reaction to the shifting pressure is exerted by the plate 5 and in turn by the engine crank-shaft 1 to which the plate 5 is attached. This clutching action is effected by direct power application by the operator.

It will be noted that both the driving and driven clutch elements are assembled upon the drive shaft and that the driven shaft and associated parts may be separately assembled including the plate 40, and when in position may be mounted to the driven clutch member by the cap screws 42. In the event that the driven shaft and its associated parts are disassembled, this is accomplished by taking out the cap screws 42 leaving the driving and driven clutch parts mounted upon the engine. Thus even with the shaft 3 disassembled the engine can be operated in its usual manner, there being no danger of throwing the weights off as the plate 31 is always in position. In this regard it may be pointed out that the flange 23 is provided to give strength to the part 22 so that it will not flex or bend as the weights are thrown outwardly against it. Also it will be noted that the plate or ring 40 is of relatively thin stock, preferably of steel and it is capable of a small amount of flexing. In assembling the driven shaft 3 and its associated parts to the engine crankshaft and its associated parts, perfect alignment is difficult so that some times the driven shaft 3 and the crankshaft 1 are slightly out of alignment. This is taken care of by the flexibility of the member 40. In a structure of this kind the driven clutch parts may be balanced either alone or with the engine and the shaft 3 and its associated parts may be separately balanced with the result that when final assembly is made all parts are balanced and centered.

It is important to note that the lever 55, while it advantageously is located in the position of the usual clutch pedal, is not, in any proper sense of the word, a clutch pedal. It is not operated during gear shifting operation and plays no part in the operation of the centrifugal clutch. This pedal may only be used occasionally or rarely to lock out the overrunning clutch depending upon the desires of the particular operator or conditions under which it is operated, and rare indeed will be its further movement to engage friction material 29 with the weights 10 as this would only occur when it is desirable or necessary to start the engine by movement of the vehicle. It will be appreciated that it is optional with the operator to have the overrunning clutch functioning or locked out and that gear shifting may be accomplished in the manner above described under either condition.

I claim:

1. The combination of the crank-shaft or the like of an engine, a driving clutch member on the shaft rotating therewith, a driven clutch member journaled on the shaft, centrifugally controlled means carried by the first clutch member adapted to engage the driven clutch member upon adequate R. P. M. of the shaft, a driven shaft, means connecting the driven clutch member and driven shaft, an overrunning clutch in said means, and control means for locking out the overrunning clutch and for effecting driving engagement between the first mentioned clutch members whereby driving effort may be transmitted from the driven shaft to the engine shaft.

2. The combination of the crank-shaft or the like, of an engine, a clutch member on the shaft rotating therewith, a driven clutch member journaled on the shaft, centrifugally controlled devices carried by the first clutch member adapted to engage the driven clutch member upon adequate R. P. M. of the shaft, a driven shaft, means connecting the driven clutch member and driven shaft, said means being axially shiftable upon the driven shaft, an overrunning clutch in said means, control means axially shiftable on the shaft and movable into engagement with the first mentioned means to lock out the overrunning clutch, said control means being shiftable to axially shift said first mentioned means, and means associated with the first means and driven clutch member for shifting the driven clutch member into frictional engagement with the first mentioned clutch member.

3. The combination of a crank-shaft or the like of an engine, a driving clutch member mounted on the shaft to rotate therewith, a driven clutch member journaled on the shaft and axially reciprocable thereon, means for holding the driven clutch member at one end of its reciprocable movement, centrifugally controlled means on the driving clutch member for effecting clutching engagement between the driving and driven clutch members upon rotation of the shaft, and means for shifting the driven clutch member along the shaft for effecting clutching engagement between the driving and driven members independent of the centrifugally controlled means.

4. The combination of a crank-shaft or the like of an engine, a driving clutch member mounted on the shaft to rotate therewith, a driven clutch member journaled on the shaft and axially reciprocable thereon, spring means for holding the driven clutch member at one end of its reciprocable movement, centrifugally controlled means on the driving clutch member for effecting clutching engagement between the driving and driven clutch members upon rotation of the shaft, and means for shifting the driven clutch member along the shaft for effecting clutching engagement between the driving and driven members independent of the centrifugally controlled means.

5. The combination of the crank-shaft or the like of an engine, a driving clutch member secured thereto, a driven clutch member journaled thereon, centrifugally controlled clutch elements carried by the driving member for engaging the driven member on adequate shaft rotation, said driven clutch member being axially shiftable, a driven shaft, means comprising an overrunning clutch, axially shiftable upon the driven shaft and connecting the driven shaft and driven clutch member, control means on the driven shaft and axially shiftable thereon, interengaging teeth upon part of the overrunning clutch and control means for locking out the overrunning clutch, and interengaging abutments on the control means and overrunning clutch for shifting the overrunning clutch and the driven clutch member, and clutch facing material for establishing a clutching engagement between driving and driven clutch members upon axial shifting of the driven clutch member.

6. The combination of a crank-shaft or the like of an engine, driving and driven clutch members on the crank-shaft, centrifugal means for establishing clutch engagement, a driven shaft, an overrunning clutch between the driven clutch member and the driven shaft, facing material between the driving and driven clutch members adapted for engagement independent of the centrifugal means, a control element axially shiftable on the driven shaft out of engagement with the overrunning clutch in one position, means for moving the control element into engagement with the overrunning clutch to lock out the overrunning clutch, and means for holding the control element in this position.

7. The combination of a crank-shaft or the like of an engine, driving and driven clutch members on the crank-shaft, centrifugal means for establishing clutch engagement, a driven shaft, an overrunning clutch between the driven clutch member and the driven shaft, facing material between the driving and driven clutch members adapted for engagement independent of the centrifugal means, a control element axially shiftable on the driven shaft out of engagement with the overrunning clutch in one position, means for moving the control element into engagement with the overrunning clutch to lock out the overrunning clutch, means for holding the control element in this position, said moving means being movable to shift the control element to a third position, and means actuated by the last movement of the control element for effecting clutch engagement between the driving and driven clutch members independent of the centrifugal means.

8. In a clutch, a clutch member shaped to provide a circumferential offset, a plurality of segmental weights disposed radially outward of the offset, and corrugated flexible sheet metal members connecting the weights and clutch member.

9. In a clutch, a clutch member shaped to provide a circumferential offset, segmental centrifugally controlled weights positioned adjacent the offset, and a flexible corrugated sheet metal plate for supporting each weight and rigidly attached to the clutch member and weight.

10. In a clutch, a clutch member shaped to provide a circumferential offset, segmental centrifugally controlled weights positioned adjacent the offset, and a flexible corrugated sheet metal plate for supporting each weight and rigidly attached to the clutch member and weight, said sheet metal members being each disposed substantially on a chord of the circumferential offset.

11. In a clutch, a clutch member shaped to provide axially extending parts, segmental weights located radially outward of said parts, said parts having apertures, lugs secured to the weights and extending inwardly through the apertures, and a flexible corrugated sheet metal member for each weight rigidly attached to the axially extending portion and lugs.

12. In a clutch, a clutch member shaped to provide axially extending parts, segmental weights located radially outward of said parts, said parts having apertures, lugs secured to the weights and extending inwardly through the apertures, and a flexible corrugated sheet metal member for each weight rigidly attached to the axially extending portion and lugs, said sheet metal members being flexible and extensive to permit the weights to move radially outward by centrifugal action and serving normally to hold the weights radially inward substantially seating upon the axially extending parts.

13. In a clutch, a driving member, a driven member, a segmental weight shiftable radially by centrifugal force to engage the members, means for supporting the weight comprising sheet metal stock positioned radially inwardly of the weight and extending in a direction substantially at right angles to the shifting movement of the weight, means securing the sheet metal stock to one of the members at a point substantially on a radial line passing through the center of the segment, means securing the opposite ends of the sheet metal stock to the segmental weight, said sheet metal stock being corrugated between the first mentioned securing means and both of its ends with the corrugations extending transversely.

14. In a clutch, a driving member, a driven member, a segmental weight shiftable radially by centrifugal force to engage the members, means for supporting the weight comprising sheet metal stock positioned radially inwardly of the weight and extending in a direction substantially at right angles to the shifting movement of the weight, means securing the sheet metal stock to one of the members at a point substantially on a radial line passing through the center of the segment, means securing the opposite ends of the sheet metal stock to the segmental weight, said sheet metal stock being corrugated between the first mentioned securing means and both of the ends with the corrugations extending transversely, said sheet metal stock being of spring metal and serving to hold the segmental weight normally radially inward.

ERNEST E. WEMP.